E. R. SUTCLIFFE.
TREATMENT OF SLAG FOR THE MANUFACTURE OF BRICKS AND FOR OTHER PURPOSES.
APPLICATION FILED AUG. 17, 1914.
1,171,676.   Patented Feb. 15, 1916.
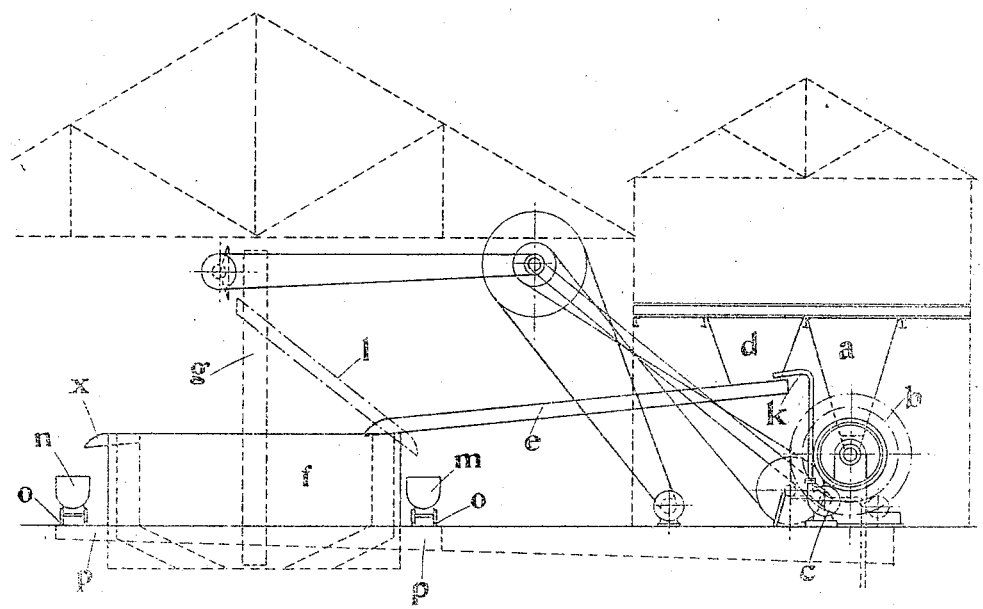
Witnesses—
Stanley Wood
Robert Owen Hughes.
Inventor
Edgar Rouse Sutcliffe
by
Attorney.

UNITED STATES PATENT OFFICE.

EDGAR ROUSE SUTCLIFFE, OF LEIGH, ENGLAND.

TREATMENT OF SLAG FOR THE MANUFACTURE OF BRICKS AND FOR OTHER PURPOSES.

1,171,676.  Specification of Letters Patent.  Patented Feb. 15, 1916.

Application filed August 17, 1914. Serial No. 857,250.

*To all whom it may concern:*

Be it known that I, EDGAR ROUSE SUT-CLIFFE, a subject of the King of Great Britain and Ireland, residing at Leigh, Lancashire, England, have invented certain new and useful Improvements in and Relating to the Treatment of Slag for the Manufacture of Bricks and for other Purposes, of which the following is a specification.

In the manufacture of bricks from slag obtained from blast furnaces and other sources it is usual to granulate the slag by causing it while in a molten or heated condition to pass into running water, whereby it is disintegrated. The disintegrated slag is then drained of water and intimately mixed with slaked lime, and the mass then pressed or molded into bricks.

The invention consists in an improved process of treating slag, more especially for the manufacture of bricks but applicable also for other purposes.

According to the invention the particles of granulated slag are coated with lime by treatment in a thick mixture of lime and water to which powdered slag may be added. After draining and standing to be brought into condition for use the slag may be readily formed into bricks by compression, no grinding being needed. The usual treatment of the dry slag with lime is thus dispensed with.

Many slags when granulated in water become light and porous and similar in character to pumice-stone, but unlike the latter such slags when granulated are brittle and friable so that their employment in the manufacture of bricks, blocks and partitions is hindered; and it is difficult in the use of such slags to produce a good strong product which at the same time retains its lightness.

It has been found that if the granulation of the slag is effected by passing it in the molten or heated condition into a mixture of lime and water, the treated slag is greatly improved in binding qualities and in hardness. Now, according to the present invention, the slag is granulated directly in the mixture of lime by which the coating of the particles of disintegrated slag is effected. Similarly, the granulation of the slag may be effected in the mixture of lime in which ground or powdered slag has been introduced. According to the invention, again, the lime and water with the granulated slag may pass into a sump or reservoir provided with an overflow, within which sump or reservoir the heavy particles of the slag may sink to the bottom, while the lighter particles may float and flow out through the overflow. By such means the light and heavy particles are simply separated. The heavy particles may be dredged from the sump by means of a conveyer and passed on to a perforated wagon and thence into a heap to drain; while the lighter particles may be caused to fall into perforated wagons on the way from the overflow, and thence be carried to a tip to drain.

The invention also comprises the apparatus hereinafter described.

In carrying the invention into effect, according to one method I may cause the molten slag to fall into a running stream of a mixture of one part of lime to four parts of water. For this purpose the milk of lime thus produced may be pumped into inclined troughs into which the molten slag is delivered, and the mixture may then pass into wagons provided with perforated sides from which the excess lime water and water may drain and be conducted back to a sump or reservoir containing the supply. The granulated slag after having been thus partially drained is carried on the wagons and dumped in heaps and permitted to stand for a period for example of seven days. By this time the slag may then be in a state in which it readily crumbles. It may then be pressed or molded directly into bricks or blocks which may be hardened in the usual way, by exposure to the atmosphere or by treatment with high or low pressure steam or carbonic acid gas.

In carrying the invention into effect according to another method I may grind the lime with a portion of the slag, and with water in a tube mill, by which a liquid slip is produced in the proportion, for example, of 2 of lime to 1 of slag to 4 of water. This slip may be pumped into a trough into which molten or heated blast furnace slag is fed. The blast furnace slag may be led into this trough from a hopper or from a trough, and the mixture then passes into a sump or reservoir. In this manner the granules of slag are coated with lime and this coating eventually hardens.

The sump is provided with an overflow through which the slip and the lighter particles of the slag may pass. Now most slags consist of heavy and lighter particles. The heavy particles will sink to the bottom of the sump, while the lighter particles will float in the denser slip and thus be washed out with the overflow. The heavy particles of the slag may be dredged up from the sump by means of an elevator, and passed into perforated wagons which may run on to a tip where the mass is dumped into a heap. The lighter particles of slag may pass into perforated wagons from the overflow, and thence be passed on to a tip for draining. It will be understood that after standing to drain and to be brought into the condition for use the heavy slag may be molded into ordinary bricks, while the lighter slag may be formed into light bricks.

The accompanying drawing illustrates diagrammatically a plant or apparatus suitable for carrying out the process of the invention.

In the drawing, $b$ represents a tube mill which is fed through the hopper $a$ and in which a portion of the slag may be ground with the lime into a slip. A centrifugal pump $c$ is provided by means of which the lime slip is pumped into the steel trough $e$. The molten or heated slag may pass into the trough $e$ from the hopper $d$, where it is washed and granulated by the lime slip that is discharged into the trough through the pipe $k$. The lime slip and granulated slag pass into a sump or reservoir $f$, in which the heavy particles of the slag fall to the bottom, whence they are lifted by means of an inclined elevator $g$. By this means the heavy slag is lifted into position beyond the sump or reservoir $f$ and is discharged, for example, into a trough $l$ arranged in front of the sump, from which trough it falls into a wagon $m$ provided with perforated sides. The liquid slip and the lighter particles of slag pass through the overflow $x$ into wagons $m$ on the opposite side of the sump from which wagons the surplus water drains. Sets of rails $o, o$ may be arranged alongside the sump or reservoir and may extend beyond for the purpose of carrying the slag to the tips or heaps.

In a position beside the sump where the wagons $m$ and $n$ are loaded with heavy and light slag respectively, by such means as scoops or shovels a drain may be provided beneath the rails, into which the greater part of the water may drain, so that the water may be quickly removed and the heaps quickly and effectively drained of the surplus water. A drain may advantageously extend centrally the whole length of the area where the slag is dumped, and branch drains may discharge into the main drain. Over this area a roof or shed may advantageously be erected.

What I claim as my invention and desire to secure by Letters Patent is:—

1. A process for treating slag, consisting in granulating molten slag, in a thick mixture of lime and water, draining and drying the mass, and compressing it, substantially as described.

2. A process for treating slag, consisting in granulating molten slag in a thick mixture of lime and water, to which slag in a finely divided condition is added; draining and drying the mass, and compressing it, substantially as described.

3. A process for treating slag, consisting in granulating molten slag in a thick mixture of lime and water, separating the lighter from the heavier particles of the mass, and then separately treating the masses produced, substantially as described.

In testimony whereof I have hereunto signed my name to this specification in the presence of two subscribing witnesses.

EDGAR ROUSE SUTCLIFFE.

Witnesses:
ROBERT OWEN HUGHES,
SAMUEL GREENBERG.